United States Patent
Aghssa et al.

[11] Patent Number: 6,053,566
[45] Date of Patent: Apr. 25, 2000

[54] REAR BODY ASSEMBLY FOR MOTOR VEHICLES

[75] Inventors: Peyman Aghssa, Ann Arbor; Senthil A. Gurusami, West Bloomfield; John J. Fusco, White Lake, all of Mich.

[73] Assignee: Ford Global Technologies, Inc., Dearborn, Mich.

[21] Appl. No.: 09/121,562

[22] Filed: Jul. 23, 1998

[51] Int. Cl.[7] ...................................................... B60J 7/00
[52] U.S. Cl. ...................... 296/188; 296/195; 296/203.01
[58] Field of Search ..................................... 296/188, 189, 296/195, 203.01, 203.04

[56] References Cited

U.S. PATENT DOCUMENTS

| | | | |
|---|---|---|---|
| 2,108,215 | 2/1938 | Stief et al. | 296/203.01 |
| 3,021,172 | 2/1962 | Fiala et al. | 296/203.01 X |
| 4,392,684 | 7/1983 | Yoshitsugu et al. | 296/185 |
| 5,419,609 | 5/1995 | Kmiec et al. | 263/188 |
| 5,480,208 | 1/1996 | Cobes et al. | 296/203 |
| 5,549,349 | 8/1996 | Corporon et al. | 276/188 |
| 5,562,329 | 10/1996 | Srock et al. | 296/203 |
| 5,602,734 | 2/1997 | Kithil | 364/424 |
| 5,605,371 | 2/1997 | Borchelt et al. | 296/188 |
| 5,641,194 | 6/1997 | Honma et al. | 296/188 |
| 5,642,792 | 7/1997 | June | 188/377 |
| 5,653,495 | 8/1997 | Bovellan et al. | 296/188 |

FOREIGN PATENT DOCUMENTS

| | | |
|---|---|---|
| 3815510 | of 0000 | Germany . |
| 3128778 | of 0000 | Japan . |
| 58126262 | of 0000 | Japan . |
| 6220765 | of 0000 | Japan . |
| 56-34570 | 8/1979 | Japan ..................... 296/195 |

*Primary Examiner*—D. Glenn Dayoan
*Assistant Examiner*—Lori L. Coletta
*Attorney, Agent, or Firm*—David B. Kelley

[57] ABSTRACT

A rear body assembly for a motor vehicle includes a floorpan extending longitudinally, a pair of rails extending longitudinally and spaced transversely adjacent the floorpan, and each of the rails having a rear portion with a plurality of convolutions tapering away from the floorpan to absorb energy upon an impact on a rear of the motor vehicle.

14 Claims, 2 Drawing Sheets

REAR BODY ASSEMBLY FOR MOTOR VEHICLES

BACKGROUND OF THE INVENTION

1. Field of the Invention

The present invention relates generally to bodies for motor vehicles and, more specifically, to a rear body assembly for a motor vehicle.

2. Description of the Related Art

It is known to provide a rear body for a motor vehicle. Typically, the rear body includes a floorpan, rails, body panels, a rear suspension system, and a fuel system. On some motor vehicles, the rear body may include a spare tire and door track for a sliding door. Most motor vehicles typically include a rear bumper system at a rear end of the rear body. During an impact on a rear of the motor vehicle, the rear bumper system and the rails, floorpan and body panels of the rear body are the main energy absorbing components.

During the initial stages of an impact on the rear of the motor vehicle (e.g., forty milliseconds), up to one-quarter of the energy of the impact is absorbed by the rear bumper system. The remaining energy is absorbed by the rear body. The main energy absorbing components of the rear body absorb approximately half of the energy of the impact. Although these main energy absorbing components have worked well, there is a need in the art to make these components more energy absorbing.

SUMMARY OF THE INVENTION

Accordingly, the present invention is a rear body assembly for a motor vehicle. The rear body assembly includes a floorpan and a plurality of rails extending longitudinally and spaced transversely adjacent the floorpan. The rails have a rear portion with a plurality of convolutions tapering away from the floorpan to absorb energy upon an impact on a rear of the motor vehicle.

One advantage of the present invention is that a new rear body assembly is provided for a motor vehicle. Another advantage of the present invention is that the main energy absorbing components of the rear body assembly absorb more energy of an impact.

Other features and advantages of the present invention will be readily appreciated as the same becomes better understood after reading the subsequent description when considered in connection with the accompanying drawings.

DESCRIPTION OF THE PREFERRED EMBODIMENT(S)

Figure 1:
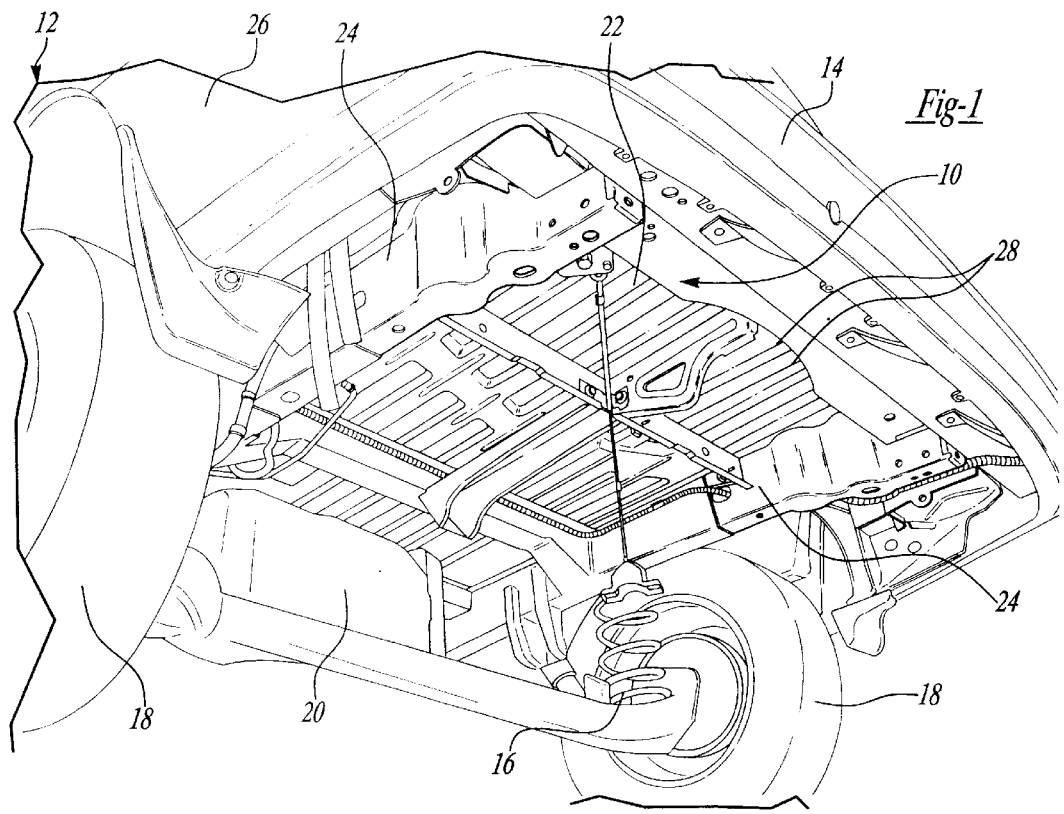
FIG. 1 is a perspective view of a rear body assembly, according to the present invention, for a motor vehicle.

Referring to the drawings and in particular FIG. 1, one embodiment of a rear body assembly 10, according to the present invention, is shown for a motor vehicle, generally indicated at 12. The motor vehicle 12 includes a bumper system 14 operatively connected to a rear end of the rear body assembly 10. The motor vehicle 12 also includes a suspension system 16 operatively connected to the rear body assembly 10 and a pair of wheels 18 spaced transversely and operatively connected to the suspension system 16. The motor vehicle 12 further includes a fuel tank 20 of a fuel system (not shown) operatively connected to a forward end of the rear body assembly 10. The motor vehicle 12 may also include a spare tire (not shown) disposed below and operatively connected to the rear body assembly 10. It should be appreciated that, except for the rear body assembly 10, the motor vehicle 12 is conventional and known in the art.

The rear body assembly 10 includes a floorpan 22 and a plurality, preferably a pair, of rails 24 spaced transversely and extending longitudinally adjacent the floorpan and operatively connected to the floorpan 22. The rear body assembly 10 also includes a plurality of body panels 26 operatively connected to the floorpan 22 and rails 24.

Figure 2:
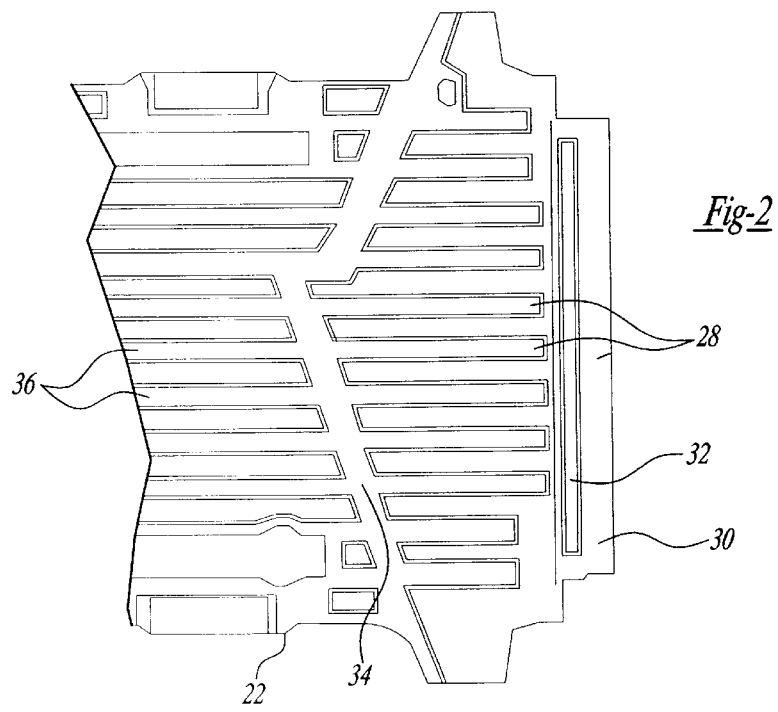
FIG. 2 is a plan view of a floorpan for the rear body assembly of FIG. 1.

Referring to FIGS. 1 and 2, the floorpan 22 is generally planar and extends longitudinally and transversely. The floorpan 22 includes a plurality of undulations 28 extending longitudinally. The undulations 28 are approximately two inch wide and one-half inch in depth. The floorpan 22 also has a rear portion 30 at a rear end of the undulations 28. The rear portion 30 has a groove 32 extending transversely that acts as a trigger to initiate crush of the floorpan 22 upon an impact and allows energy dissipation to be more in the rear body assembly 10 than in the body panels 26. The groove 32 is approximately one inch wide and one inch in depth. The floorpan 22 has another groove or trough 34 at a forward end of the undulations 28 and extending diagonally along the floorpan 22. The trough 34 has a general "Y" shape and allows wiring for the motor vehicle 12 to extend therethrough. The trough 34 is approximately three inches wide. The trough 34 terminates crush of the floorpan 22 after the impact. It should be appreciated that the floorpan 22 may have additional undulations 36 forward of the trough 34.

Figure 3:
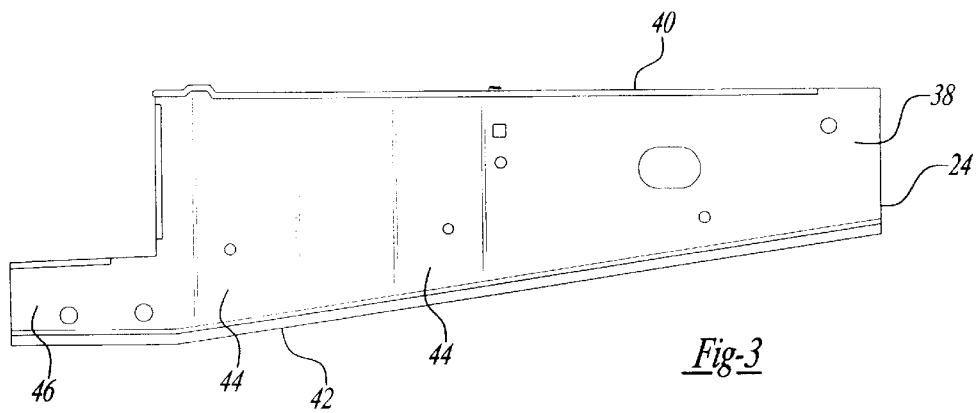
FIG. 3 is an elevational view of a rail for the rear body assembly of FIG. 1.
Figure 4:
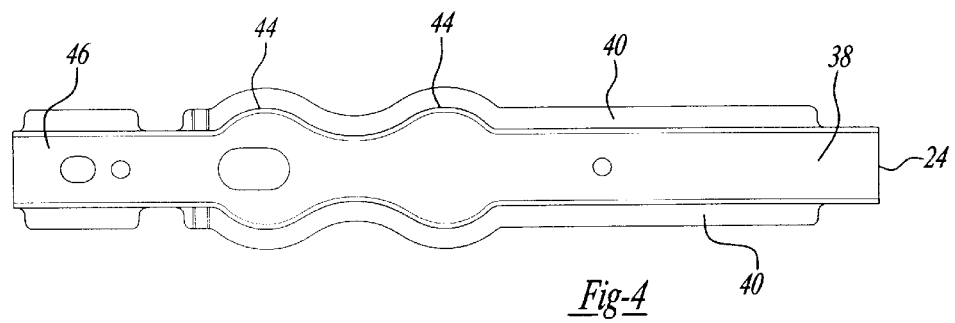
FIG. 4 is a plan view of the rail of FIG. 3.

Referring to FIGS. 1, 3 and 4, the rails 24 extend longitudinally and have a body 38 with a generally inverted U-shape configuration and flanges 40 extending transversely from the body 38 which are secured to the floorpan 22 by suitable means such as welding. The rails 24 have a rear portion 42 tapering away from the floorpan 22. The rear portion 42 has at least one, preferably a plurality of convolutions 44 that collapse or crush like an accordion and absorb energy of an impact. Preferably, the rear portion 42 has two convolutions 44. The rails 24 also have a step portion 46 at the end of the rear portion 42 to engage the bumper system 14. The step portion 46 has a general L-shape. It should be appreciated that the step portion 46 is secured to the bumper system 14 by suitable means such as welding.

Figure 5:
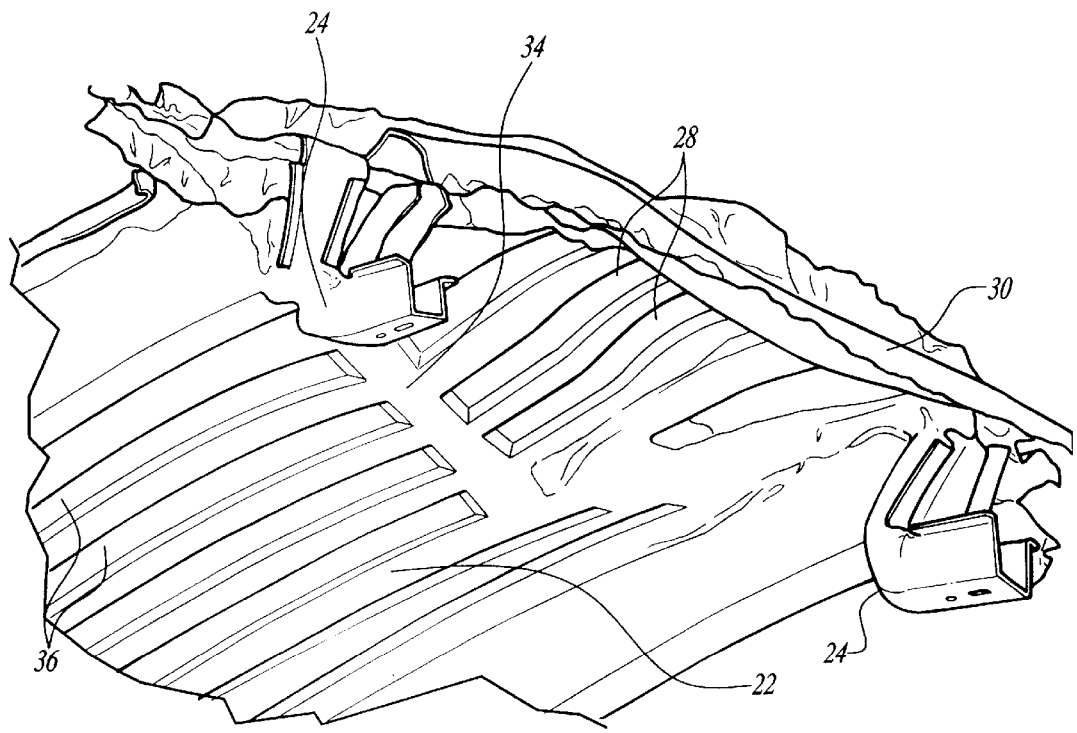
FIG. 5 is a perspective view of the rear body assembly of FIG. 1 illustrating the rear body assembly after an impact.

In operation, upon an impact on the rear of the motor vehicle 12, the bumper system 14 absorbs the energy of the impact during the initial ten milliseconds. The combination of the convolutions 44 in the rails 24 and the groove 32 and undulations 28 in the floorpan 22 work together such that the rear body assembly 10 absorbs a great deal of the energy as illustrated in FIG. 5. As a result, the rear body assembly 10 minimizes energy transfer into rigid body components, e.g., the spare tire, etc., which act only as load paths. The rear body assembly 10 absorbs approximately sixty percent (60%) of the energy during the first forty milliseconds of an impact.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A rear body assembly for a motor vehicle comprising:

a floorpan extending longitudinally;

a pair of rails extending longitudinally and spaced transversely adjacent said floorpan; and each of said rails having a rear portion tapering away from said floorpan and including a plurality of convolutions extending laterally to absorb energy upon an impact on a rear of the motor vehicle.

2. A rear body assembly as set forth in claim 1 wherein said convolutions is two.

3. A rear body assembly as set forth in claim 1 wherein said floorpan includes a mechanism to initiate crush of said floorpan upon the impact.

4. A rear body assembly as set forth in claim 3 wherein said mechanism is a groove extending transversely along said floorpan.

5. A rear body assembly as set forth in claim 1 wherein said floorpan includes a mechanism to terminate crush of said floorpan after the impact.

6. A rear body assembly as set forth in claim 5 wherein said mechanism is a trough extending diagonally along said floorpan.

7. A rear body assembly as set forth in claim 1 wherein said floorpan has a plurality of undulations.

8. A rear body assembly for a motor vehicle comprising:

a floorpan extending longitudinally;

a pair of rails extending longitudinally and spaced transversely adjacent said floorpan;

each of said rails having a rear portion tapering away from said floorpan to absorb energy upon an impact on a rear of the motor vehicle; and said floorpan including a mechanism to initiate crush of said floorpan upon the impact.

9. A rear body assembly as set forth in claim 8 wherein said floorpan has a plurality of undulations.

10. A rear body assembly as set forth in claim 9 wherein said mechanism is a groove extending transversely along said floorpan at a rear of said undulations.

11. A rear body assembly as set forth in claim 9 wherein said floorpan includes a mechanism to terminate crush of said floorpan after the impact.

12. A rear body assembly as set forth in claim 11 wherein said mechanism is a trough extending diagonally along said floorpan at a forward end of said undulations.

13. A rear body assembly as set forth in claim 8 wherein said rear portion has a plurality of convolutions.

14. A rear body assembly for a motor vehicle comprising:

a floorpan extending longitudinally and having a plurality of undulations;

a pair of rails extending longitudinally and spaced transversely adjacent said floorpan;

each of said rails having a rear portion tapering away from said floorpan and including a plurality of convolutions extending laterally to absorb energy upon an impact on a rear of the motor vehicle;

said floorpan including a groove extending transversely to initiate crush of said floorpan upon the impact; and said floor pan including a trough extending diagonally to terminate crush of said floorpan after the impact.

* * * * *